(12) United States Patent
Ding et al.

(10) Patent No.: US 10,318,045 B2
(45) Date of Patent: Jun. 11, 2019

(54) GRAPHIC STRUCTURE OF TOUCH ELECTRODE, TOUCH DISPLAY PANEL AND TOUCH DISPLAY DEVICE

(71) Applicants: SHANGHAI TIANMA MICRO-ELECTRONICS CO., LTD., Shanghai (CN); TIANMA MICRO-ELECTRONICS CO., LTD., Shenzhen (CN)

(72) Inventors: Hong Ding, Shanghai (CN); Qijun Yao, Shanghai (CN); Liang Liu, Shanghai (CN); Xuening Liu, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 269 days.

(21) Appl. No.: 15/175,492

(22) Filed: Jun. 7, 2016

(65) Prior Publication Data
US 2017/0255321 A1 Sep. 7, 2017

(30) Foreign Application Priority Data
Mar. 1, 2016 (CN) .......................... 2016 1 0115282

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04103* (2013.01); *G06F 2203/04111* (2013.01)

(58) Field of Classification Search
None
See application file for complete search history.

(56) References Cited

U.S. PATENT DOCUMENTS

2014/0292703 A1  10/2014  Yilmaz
2015/0091842 A1*  4/2015  Shepelev ................ G06F 3/044
                                                              345/174

FOREIGN PATENT DOCUMENTS

| CN | 102360260 A | 2/2012 |
| CN | 105190498 A | 12/2015 |
| WO | 2012/177955 A2 | 12/2012 |

OTHER PUBLICATIONS

Examination report dated Nov. 8, 2016 by the German Patent and Trademark Office in the corresponding application.

* cited by examiner

*Primary Examiner* — Amare Mengistu
*Assistant Examiner* — Sarvesh J Nadkarni
(74) *Attorney, Agent, or Firm* — Kilpatrick Townsend & Stockton LLP

(57) ABSTRACT

A graphic structure of a touch electrode is provided, and the graphic structure of a touch electrode a plurality of touch electrode assemblies which are arranged in an array mode and at least one of which is mutually fit with and insulated from the adjacent touch electrode assembly. The touch electrode assembly comprises at least one first touch electrode and at least one second touch electrode, and the first touch electrodes and the second touch electrodes are insulated from each other; the ratio of widths of any first touch electrode and any second touch electrode in the first direction is in the range of 0.9-1.12, thereby solving the issue of graphic visibility when a touch display panel with mutually fit touch electrodes displays an image. Further, the touch display panel and a touch display device disclosure also (Continued)

have the characteristic of high touch sensitivity, so that a user has a better touch experience.

20 Claims, 14 Drawing Sheets

GRAPHIC STRUCTURE OF TOUCH ELECTRODE, TOUCH DISPLAY PANEL AND TOUCH DISPLAY DEVICE

TECHNICAL FIELD

The disclosure relates to the field of display, and in particular, to a graphic structure of a touch electrode, a touch display panel and a touch display device.

BACKGROUND

As an input medium, a touch screen is the most simple, convenient and natural human-computer interaction mode at present. It has become a research and development hot spots of more and more flat-panel display manufacturers that a touch function is integrated on the display device.

A capacitive touch is a widely used touch technique at present. In order to reduce the thickness of a display panel and achieve the touch function, a touch structure is generally integrated into the display panel. A plurality of touch electrodes are formed in a display area. The touch electrode can be multiplexed with common electrodes of display pixels and driven in a time division mode. At the display phase, the common electrodes receive common signals, and at the touch phase, the common electrodes receive touch signals. In the related art, in order to enhance the touch sensitivity, the touch electrodes can be set as mutually fit irregular graphics, although this type of design enhances the touch sensitivity, while brings the issue of visibility when images of the graphics of the touch electrodes are displayed, so that the display performance of the touch display panel is reduced greatly.

SUMMARY

In light of the above problems in the related art, embodiments provide a graphic structure of the touch electrode, a touch display panel and a touch display device.

One aspect of the disclosure provides a graphic structure of the touch electrode comprising a plurality of touch electrode assemblies, which are arranged in an array mode and at least one of which mutually fit with and insulated from the adjacent touch electrode assembly.

The touch electrode assembly comprises at least one first touch electrode and at least one second touch electrode, and the first touch electrodes and the second touch electrodes are insulated from each other.

Any the first touch electrode has a plurality of first effective widths in the second direction, and the ratio between any two first effective widths of the first touch electrode along the first direction is a1, wherein, $0.9 \leq a1 \leq 1.12$.

Any the second touch electrode has a plurality of second effective widths in the second direction, and the ratio between any two second effective widths of the second touch electrode along the first direction is a2, wherein, $0.9 \leq a2 \leq 1.12$. The ratio between any the first effective width and any the second effective width is b, wherein, $0.9 \leq b \leq 1.12$;

Another aspect of embodiments also provides a touch display panel comprising the graphic structure of the touch electrode.

Another aspect of embodiments also provides a touch display device comprising the touch display panel.

The graphic structure of the touch electrode, the touch display panel and the touch display device, which are adopted by the disclosure, have the following advantages:

The ratio of any two first effective widths of the first touch electrodes in the second direction, the ratio of any two second effective widths of the second touch electrodes in the second direction, as well as the ratio of any first effective width and any second effective width are set in the range of 0.9-1.12, so that the first touch electrodes and the second touch electrodes have uniform electrode effective widths in the second direction, thereby solving the issue of visibility when an image of the touch display panel is displayed; moreover, the touch display panel and the touch display device of the disclosure also have the high touch sensitivity, so that a user has a better touch experience.

DESCRIPTION OF DRAWINGS

FIG. 7b is a sectional diagram taken along AA' in FIG. 7a;

FIG. 8b is a sectional diagram taken along CC' in FIG. 8a;

DETAILED DESCRIPTION OF THE EMBODIMENTS

The disclosure is further described in detail in conjunction with accompanying drawings and embodiments. It should be understood that the particular embodiments described herein are only used for explaining the relevant disclosure, rather than limiting the disclosure. In addition, it also should be noted that parts relevant to the disclosure are only shown in the accompanying drawings for the convenience of description.

It should be noted that the embodiments in the disclosure and features in the embodiments can be combined with each other under the condition of no conflict. The disclosure will be described in detail hereinafter with reference to the accompanying drawings.

Figure 1A:
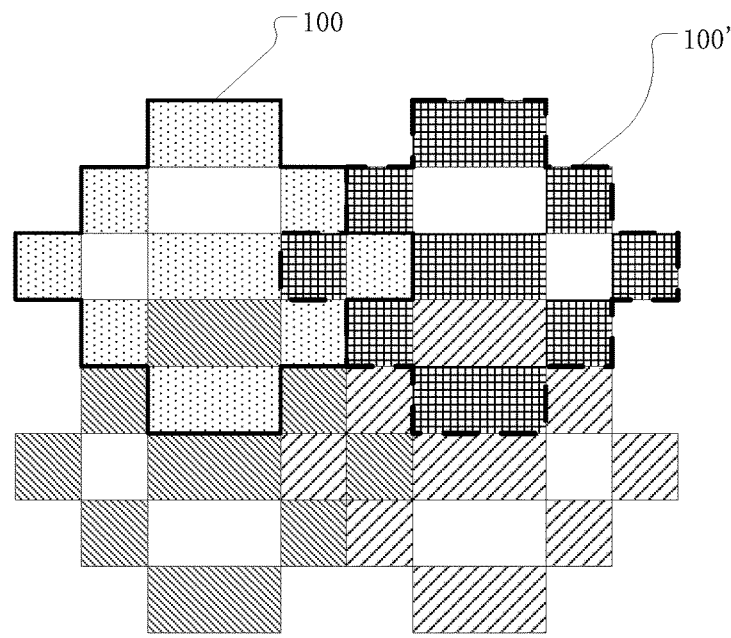
FIG. 1a is a schematic diagram of a graphic structure of a touch electrode according to an embodiment of the disclosure.
Figure 1B:
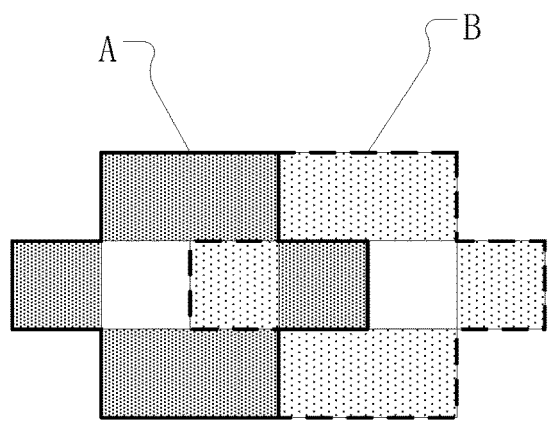
FIG. 1b is a schematic diagram of a first mutually fit mode of a plurality of touch electrode assemblies according to the embodiment of the disclosure.
Figure 1C:
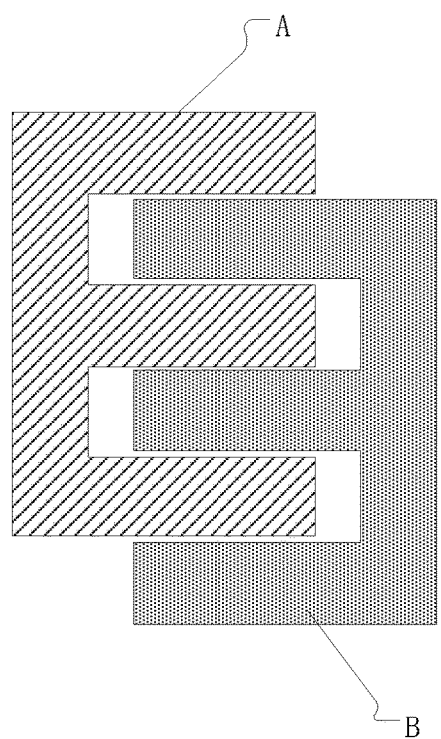
FIG. 1c is a schematic diagram of a second mutually fit mode of the plurality of touch electrode assemblies according to the embodiment of the disclosure.
Figure 2A:
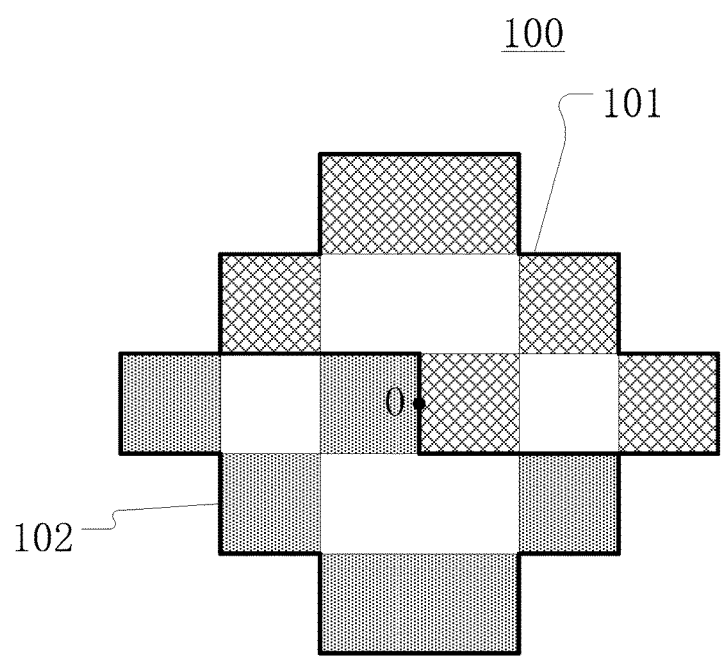
FIG. 2a is a schematic diagram of a touch electrode assembly according to the embodiment of the disclosure.
Figure 2B:
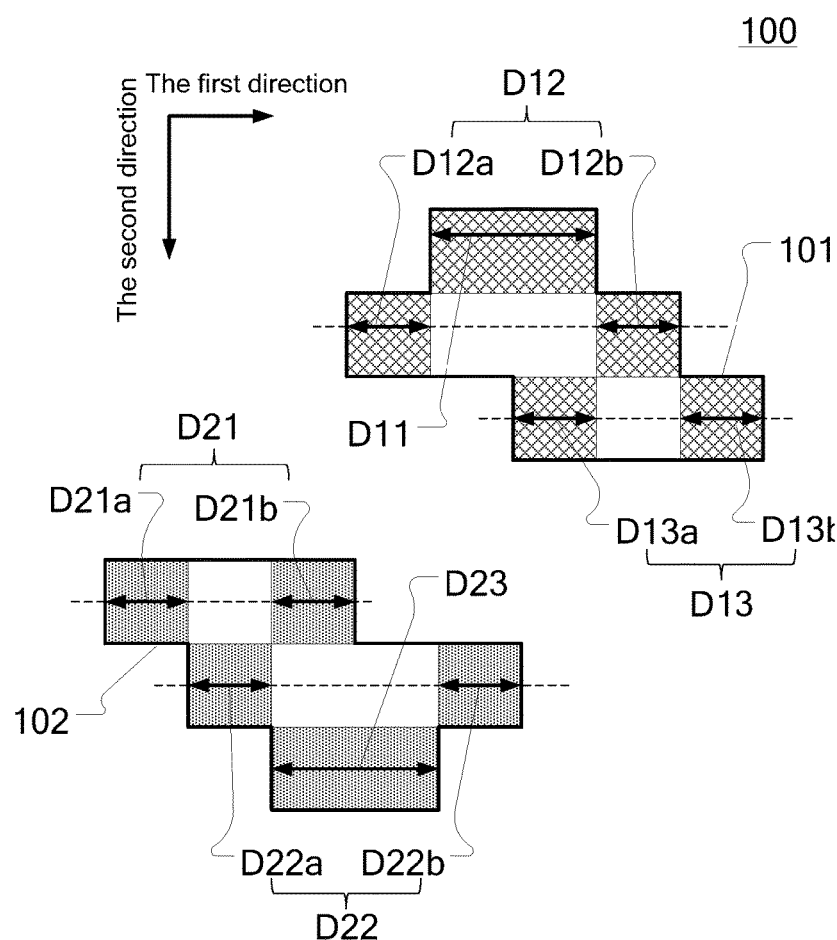
FIG. 2b is a schematic diagram of first effective widths and second effective widths according to the embodiment of the disclosure.

FIG. 1a is a schematic structure of a graphic structure of a touch electrode according to one embodiment. FIG. 1b is a schematic diagram of a first mutually fit mode of a plurality of touch electrode assemblies according to the embodiment. FIG. 1c is a schematic diagram of a second mutually fit mode of the plurality of touch electrode assemblies according to the embodiment. FIG. 2a is a schematic diagram of a touch electrode assembly according to the embodiment. FIG. 2b is a schematic diagram of first effective widths and second effective widths according to the embodiment.

Referring to FIG. 1a, the graphic structure of the touch electrode comprises a plurality of touch electrode assemblies 100, which are arranged in an array mode and at least one of which mutually fit with and insulated from the adjacent touch electrode assemblies 100'.

The plurality of touch electrode assemblies 100 are arranged in an array mode, and at least one of first touch electrode assemblies 100 mutually fit with the adjacent touch electrode assemblies 100'.

As shown in FIG. 1b, the first mutually fit mode is that partial area of a touch electrode assembly A can be completely encircled by the other touch electrode assembly B, and the mutually fit mode is called as mutually encircled fit. As shown in FIG. 1c, the second mutually fit mode is that a convex part of a touch electrode assembly A is positioned within a concave part of the other touch electrode assembly B, and the mutually fit mode is called as the mutually concave-convex fit. The mutually fit between the touch electrode assemblies enable each touch electrode assembly to be distributed more uniformly, so that the touch electrode assemblies have larger mutual capacitance effective areas, and the touch precision and sensitivity are enhanced. According to the description below of the embodiment, the embodiment provides graphic structures of a touch electrode of the touch electrode assembly with the first mutually fit mode. The other embodiments also provide the graphic structures of the touch electrodes of the touch electrode assemblies with the second mutually fit mode.

Continue to refer to FIG. 2a and FIG. 2b, the touch electrode assembly 100 comprises at least one first touch electrode 101 and at least one second touch electrode 102 which are insulated from each other.

Any first touch electrode 101 has a plurality of first effective widths in the second direction, and the ratio between any two first effective widths of a first touch electrode 101 along the first direction is a1, wherein, $0.9 \leq a1 \leq 1.12$.

Any second touch electrode 102 has a plurality of second effective widths in the second direction, and the ratio between any two second effective widths of a second touch electrode along the first direction is a2, wherein, $0.9 \leq a2 \leq 1.12$.

The ratio between any first effective width and any second effective width is b, wherein, $0.9 \leq b \leq 1.12$.

In one embodiment, a touch electrode assembly comprises at least one first touch electrode 101 and at least one second touch electrode 102 which are insulated from each other. The differentiation of the touch electrode assemblies in the embodiment directs to well describe the graphic structures of the touch electrodes provided by the embodiment, and is not functional differentiation, and the first touch electrode and the second touch electrode in one touch electrode assembly are respectively individual touch electrodes. The graphic structures of the touch electrodes can be obtained by an array arrangement of a touch electrode assembly in the first direction and in the second direction.

Any first touch electrode 101 has a plurality of first effective widths in the second direction, and the ratio between any two first effective widths of the first touch electrode 101 along the first direction is a1, wherein, $0.9 \leq a1 \leq 1.12$. The definition of the first effective width sees FIG. 2b. The first touch electrode 101 has a plurality of first effective widths in the second direction, and three first effective widths are listed herein: D11, D12 and D13 which are substantial widths of the first touch electrode along the first direction, for example, the first effective width D12 is the sum of the width D12a and D12b along the first direction, and the first effective width D13 is the sum of the width D13a and D13b along the first direction.

Similarly, the second touch electrode 102 has a plurality of second effective widths in the second direction. Three second effective widths are listed herein: D21, D22 and D23 which are substantial widths of the second touch electrode along the first direction, for instance, the second effective width D21 is the sum of the widths D21a and D21b along the first direction, and the second effective width D22 is the sum of the widths D22a and D22b along the first direction.

It should be understood that the numbers of the first effective widths and the second effective widths theoretically can be infinite, and the ratio between any two first effective widths is a1, wherein $0.9 \leq a1 \leq 1.12$. The ratio between any two second effective widths is a2, wherein, $0.9 \leq a2 \leq 1.12$; and the ratio between any the first effective width and any the second effective width is b, wherein, $0.9 \leq b \leq 1.12$.

According to the embodiment, the effective widths of each first touch electrode and each second touch electrode along the first direction are approximately equal, so that when an image is displayed, influences of display signals on each first touch electrode and each second touch electrode are basically consistent. Therefore the issue that graphics of mutually fit touch electrode assemblies are visible when being displayed can be solved. Moreover, the graphic structure of the touch electrode provided by the embodiment enable each touch electrode assembly to have more uniform distribution due to the mutually fit of each touch electrode assembly, so that each touch electrode assembly has a larger capacitive effective area, the touch precision and sensitivity can be enhanced, and pen touch can be supported better.

Alternatively, continue to refer to FIG. 2a, the touch electrode assembly 100 comprises a first touch electrode 101 and a second touch electrode 102 which are equal in shape and size. In one embodiment, one touch electrode assembly 100 consists of a first touch electrode 101 and a second touch electrode 102, and the first touch electrode and the second touch electrode are configured to be with the same shape and size. Thus, on the one hand, the manufacturing technology of the touch electrode can be simplified, and on the other hand, each first touch electrode 101 and each second touch electrode 102 have more uniform electrode arrangement modes. It can be seen from FIG. 2a, the second touch electrode 102 can be a graphic structure obtained by rotating the first touch electrode 101 180 degrees about point O.

Alternatively, the first touch electrode comprises a plurality of first touch sub-electrodes which are electrically connected each other and are rectangular electrodes; and/or The second touch electrode comprises a plurality of second touch sub-electrodes which are electrically connected each other and are rectangular electrodes.

In order to achieve the graphic structures of touch electrodes of the touch electrode assembly with the first mutually fit mode in the embodiment, the first touch electrode can comprise a plurality of first touch sub-electrodes which are electrically connected each other. It should be understood that, under the condition that the plurality of first touch sub-electrodes are combined with each other to form the first touch electrode, any two of the plurality of touch electrode assemblies can be freely fit via the first mutually fit mode, so that the plurality of touch electrode assemblies can be arranged more freely and uniformly, thereby enhancing the touch sensitivity. Alternatively, in the embodiment, the plurality of touch sub-electrodes can be rectangular electrodes, and the mutual combination among the rectangular electrodes is simpler, and the difficulty of electrode manufacturing technology can be lowered.

Alternatively, the second touch sub-electrodes can be electrodes integrally formed which have the same shape and size as the first touch sub-electrodes, and also can have a plurality of the second touch sub-electrodes connected electrically, and we will not describe in detail.

Figure 3:
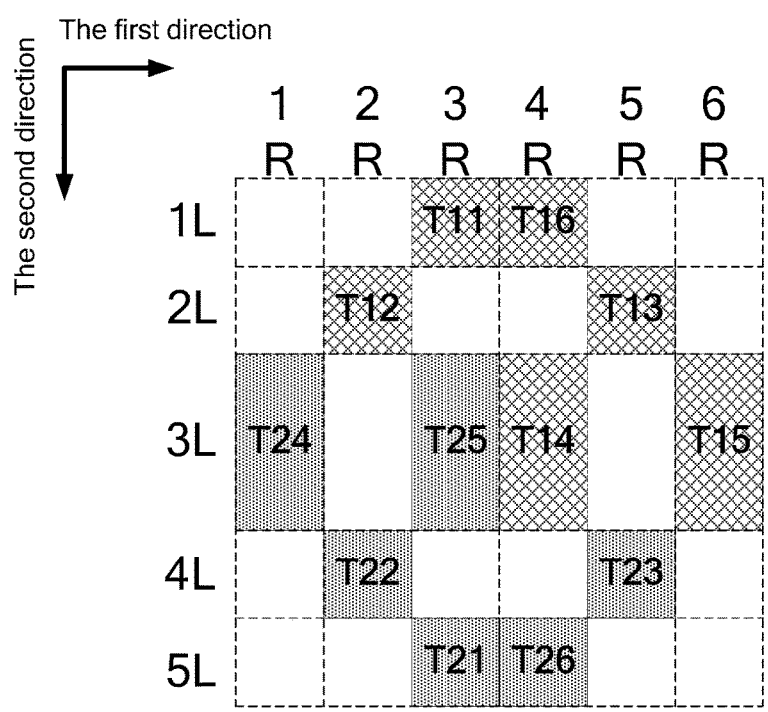
FIG. 3 is a schematic diagram of an arrangement of a plurality of first touch sub-electrodes and a plurality of second touch sub-electrodes of the touch electrode assembly according to the embodiment of the disclosure.

Alternatively, FIG. 3 is the schematic diagram of an arrangement of a plurality of first touch sub-electrodes and a plurality of second touch sub-electrodes of a touch electrode assembly provided by the embodiment. As shown in FIG. 3, the first touch electrode comprises six first touch sub-electrodes: the first touch sub-electrode 1 T11, the first touch sub-electrode 2 T12, the first touch sub-electrode 3 T13, a first touch sub-electrode 4 T14, a first touch sub-electrode 5 T15 and a first touch sub-electrode 6 T16.

The second touch electrode comprises six second touch sub-electrodes: the second touch sub-electrode 1 T21, the second touch sub-electrode 2 T22, the second touch sub-electrode 3 T23, the second touch sub-electrode 4 T24, the second touch sub-electrode 5 T25 and the second touch sub-electrode 6 T26.

For any touch electrode assembly, the first touch sub-electrode 1 T11 and the first touch sub-electrode 6 T16 are orderly arranged in the first line 1L in the first direction, the first touch sub-electrode 2 T12 and the first touch sub-electrode 3 T13 are orderly arranged in the second line 2L in the first direction, the second touch sub-electrode 6 T26, the second touch sub-electrode 5 T25, the first touch sub-electrode 4 T14 and the first touch sub-electrode 5 T15 are orderly arranged in the third line 3L in the first direction, the second touch sub-electrode 2 T22 and the second touch sub-electrode 3 T23 are orderly arranged in the fourth line 4L in the first direction, and the second touch sub-electrode 1 T21 and the second touch sub-electrode 6 T26 are orderly arranged in the fifth line 5L in the first direction.

For any touch electrode assembly, the second touch sub-electrode 4 T24 is arranged in the first row 1R in the second direction. The first touch sub-electrode 2 T12 and the second touch sub-electrode 2 T22 are orderly arranged in the second row in the second direction, the first touch sub-electrode 1 T11. The second touch sub-electrode 5 T25 and the second touch sub-electrode 1 T21 are orderly arranged in the third row 3R in the second direction. The first touch electrode 6 T16, the first touch sub-electrode 4 T14 and the second touch sub-electrode 6 T26 are orderly arranged in the fourth row 4R in the second direction. The first touch sub-electrode 3 T13 and the second touch sub-electrode 3 T23 are orderly arranged in the fifth row 5R in the second direction, and the first touch sub-electrode 5 T25 is arranged in the sixth row 6R in the second direction;

The first touch sub-electrode 1 T11 and the first touch sub-electrode 6 T16 are an integrated structure, and the second touch sub-electrode 1 T21 and the second touch sub-electrode 6 T26 are an integrated structure.

According to the graphic structure of the touch electrode provided by the embodiment, the touch electrode assembly formed by arranging a plurality of first touch sub-electrodes of the first touch electrode and a plurality of second touch sub-electrodes of the second touch electrode in a specific mode is an axial symmetrical graphic structure and has different symmetrical axes in various directions. Thus, the graphic structure of the touch electrode can guarantee that the touch at each direction has the same sensitivity. Moreover, in one touch electrode assembly, the ratio of each first effective width and the ratio of each second effective width of the first touch electrode and the second touch electrode in the first direction, and the ratio of any first effective width and any second effective width are approximately equal, so that the issue of graphic visibility of the touch electrode assembly cannot be occurred when the touch electrode assembly displays an image. Therefore, the good display effect is ensured, and the touch electrode assembly has very high touch sensitivity.

In the embodiment, the first touch sub-electrode 1 T11 and the first touch sub-electrode 6 T16 are an integrated structure; the second touch sub-electrode 1 T21 and the second touch sub-electrode 6 T26 are an integrated structure. The integrated structure means that the first touch sub-electrode 1 T11 and the first touch sub-electrode 6 T16 can be an electrode formed integrally, and the second touch sub-electrode 1 T21 and the second touch sub-electrode 6 T26 can be an electrode formed integrally. According to the embodiment, under the condition of the first mutually fit mode, an integral structure can be adopted by a plurality of first touch sub-electrodes or a plurality of second touch sub-electrodes, thereby simplifying the technology manufacturing.

Alternatively, continue to refer to FIG. 3, the length of each first touch sub-electrode of the first touch electrodes and each second touch sub-electrode of the second touch electrodes in the first direction and the length of the first touch sub-electrode 1 T11, the first touch sub-electrode 2 T12, the first touch sub-electrode 3 T13, the first touch sub-electrode 6 T16, the second touch sub-electrode 1 T21, the second touch sub-electrode 2 T22, the second touch sub-electrode 3 T23 and the second touch sub-electrode 6 T26 in the second direction are in the range of 0.75 mm-1.625 mm.

The length of the first touch sub-electrode 4 T14, the first touch sub-electrode 5 T15, the second touch sub-electrode 4 T24 and the second touch sub-electrode 5 T25 in the second direction are in the range of 1.5 mm-3.25 mm.

When the widths of each first touch sub-electrode and each second touch sub-electrode in the first direction and in the second direction meet the value conditions, the favorable touch sensitivity can be obtained, technological difficulty for manufacturing the touch electrode cannot caused, and the pen touch of 1.0 mm-2.5 mm can be supported better.

Alternatively, the length of each first touch sub-electrode of the first touch electrode in the first direction is equal to the length of each second touch sub-electrode of the second touch electrode in the first direction.

The lengths of the first touch sub-electrode 4 T14, the first touch sub-electrode 5 T15, the second touch sub-electrode 4 T24 and the second touch sub-electrode 5 T25 in the second direction are equal.

The first touch sub-electrode 1 T11, the first touch sub-electrode 2 T12, the first touch sub-electrode 3 T13, the first touch sub-electrode 6 T16, the second touch sub-electrode 1 T21, the second touch sub-electrode 2 T22, the second touch sub-electrode 3 T23 as well as the second touch sub-electrode 6 T26 in the second direction are equal.

The lengths of the first touch sub-electrode 4 T14, the first touch sub-electrode 5 T15, the second touch sub-electrode 4 T24 and the second touch sub-electrode 5 T25 in the second direction are twice the lengths of the first touch sub-electrode 1 T11, the first touch sub-electrode 2 T12, the first touch sub-electrode 3 T13, the first touch sub-electrode 6 T16, the second touch sub-electrode 1 T21, the second touch sub-electrode 2 T22, the second touch sub-electrode 3 T23 and the second touch sub-electrode 6 T26 in the second direction.

When the widths of each first touch sub-electrode and each second touch sub-electrode in the first direction and in the second direction meet the proportional condition, each touch electrode assembly can be fit better, and each touch electrode assembly can have the largest touch electrode area besides the necessary insulation distance among them, thereby enhancing the touch sensitivity.

Figure 4A:
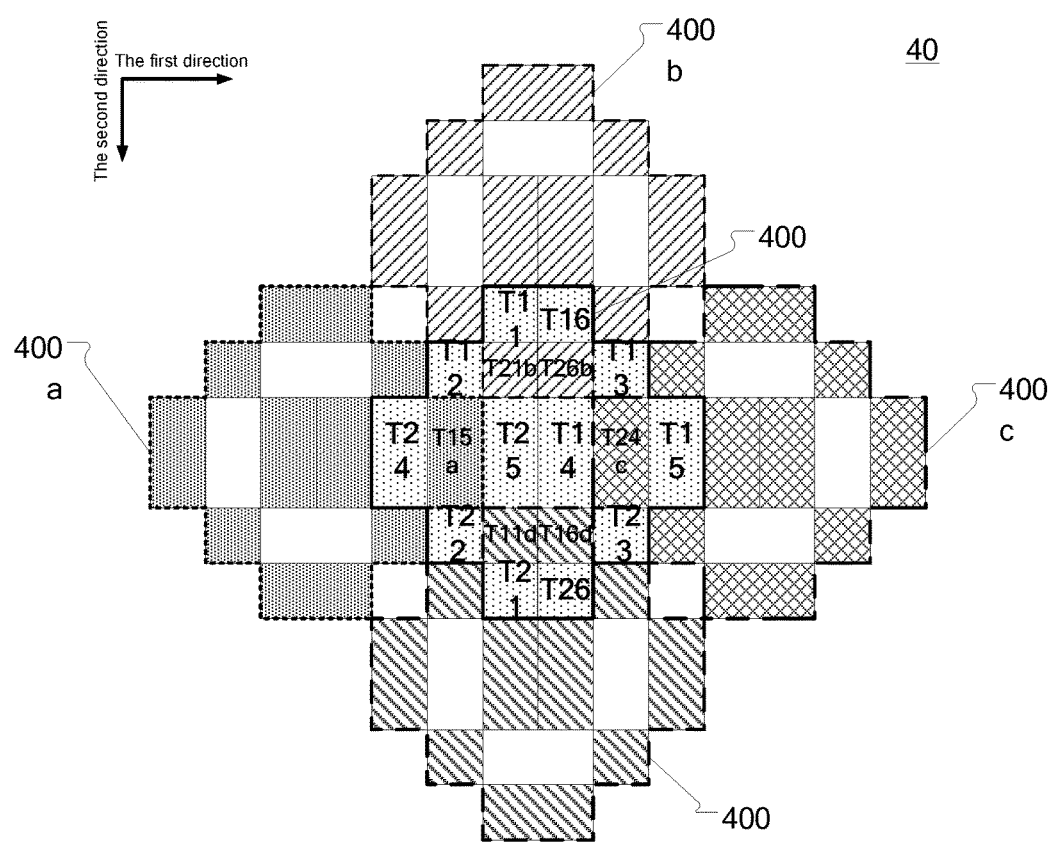
FIG. 4a is a schematic diagram of a touch electrode assembly group according to the embodiment of the disclosure.
Figure 4B:
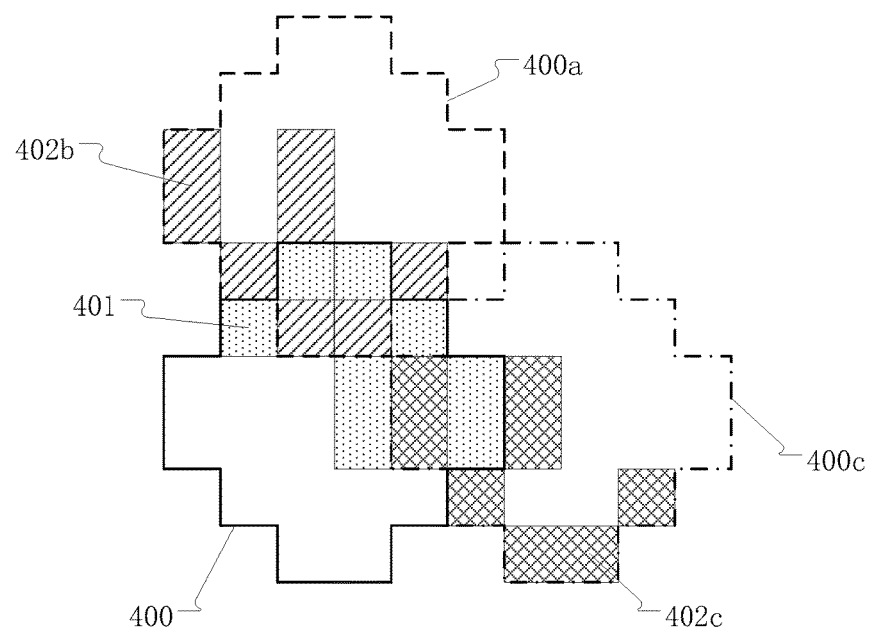
FIG. 4b of a partial schematic diagram of the touch electrode assembly group according to the embodiment of the disclosure.

FIG. 4a is a schematic diagram of a touch electrode assembly group according to the embodiment. FIG. 4b is a partial schematic diagram of the touch electrode assembly group according to the embodiment. As shown in FIG. 4a, one touch electrode assembly and four adjacent touch electrode assemblies are fit with each other to form a touch electrode assembly group 40.

The touch electrode assembly group 40 is in turn in the first direction: a first touch electrode assembly 400a, a second touch electrode assembly 400 and a third touch electrode assembly 400c.

The touch electrode assembly group 40 is in turn in the second direction: a fourth touch assembly 400b, a second touch electrode assembly 400 and a fifth touch electrode assembly 400d.

The touch electrode assembly 400 mutually fit with its two adjacent touch electrode assemblies 400a and 400c in the first direction, and mutually fit with its two adjacent touch electrodes 400b and 400d in the second direction. It can be understood by a person skilled in the art that each touch electrode assembly can fit with the adjacent touch electrode assemblies in the graphic structure of the touch electrode assembly provided by the embodiment, so as to form a tight arrangement structure of the touch electrode assemblies.

Moreover, as shown in FIG. 4b, the first touch electrode 401 in the touch electrode assembly 400 is simultaneously mutually fit with both of the second touch electrode 402b of the adjacent touch electrode assembly 400b and the second touch electrode 402c of the adjacent touch electrode assembly 400c. It should be noted that in order to show the above fit relation more clearly, the first touch electrode of the touch electrode assembly 400b and the first touch electrode of the touch electrode assembly 400c are omitted in FIG. 4b.

Similarly, the second touch electrode in the touch electrode assembly 400 is also simultaneously mutually fit with the first touch electrodes of the other two adjacent touch electrode assemblies. Because the first touch electrode and the second touch electrode in one touch electrode assembly 400 are insulated from each other, the first touch electrode and the second touch electrode of the touch electrode assembly 400 respectively mutually fit with the first touch electrode and the second touch electrode of the adjacent touch electrode assembly, so as to guarantee that all the electrically independent touch electrodes can mutually fit with the adjacent touch electrodes in the graphic structure of the whole touch electrode. The distribution area of the touch electrodes is enhanced maximally, so that the touch sensitivity is enhanced maximally. Moreover, the ratio of each first effective width, the ratio of each second effective width as well as any first effective width and any second effective width of the first touch electrodes and second touch electrodes along the first direction are approximately equal, so that the visible issue of the graphics of the touch electrode assemblies cannot be occurred when the touch electrode assemblies display images, thereby ensuring the good display effect.

Figure 5A:
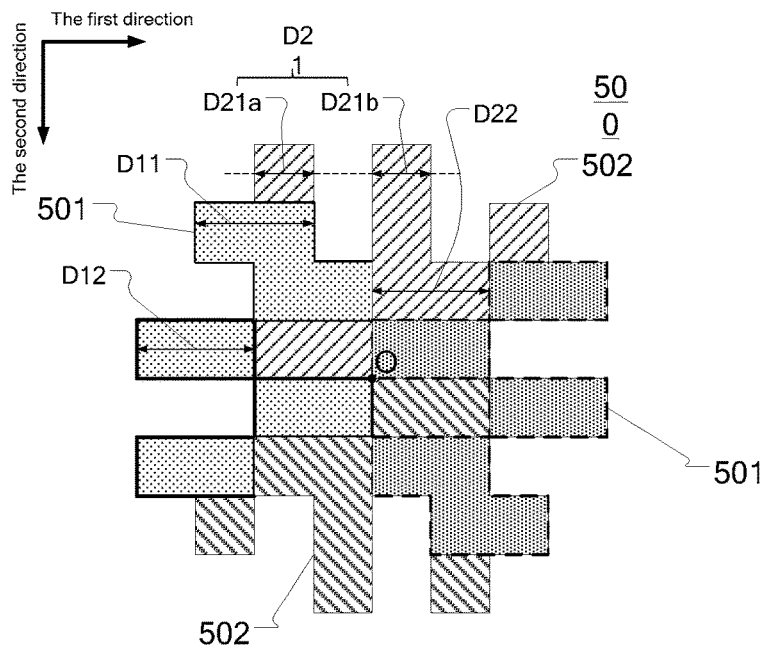
FIG. 5a is a schematic diagram of a graphic structure of a touch electrode according to another embodiment of the disclosure.
Figure 5B:
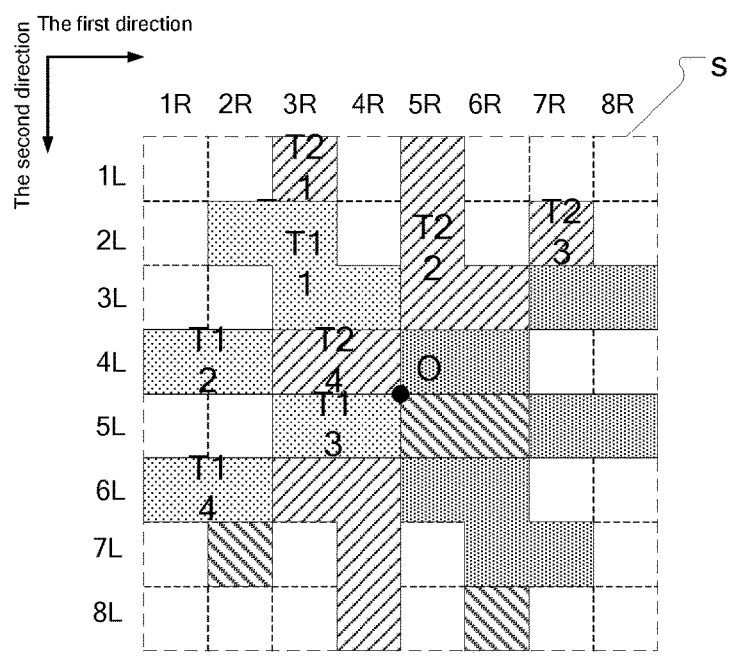
FIG. 5b is a schematic diagram of a checkerboard lattice according to the embodiment of the disclosure.

FIG. 5a is a schematic diagram of a graphic structure of a touch electrode according to another embodiment. FIG. 5b is a schematic diagram of a checkerboard lattice in the embodiment. As shown in FIG. 5a and FIG. 5b, a touch electrode assembly 500 comprises two first touch electrodes 501 and two second touch electrodes 502. The touch electrode assembly 500 is positioned in a checkerboard lattice S with eight-line and eight-row, and the checkerboard lattice comprises 64 sublattices.

The first touch electrode each comprises four first touch sub-electrodes: a first touch sub-electrode 1 T11, a first touch sub-electrode 2 T12, a first touch sub-electrode 3 T13 and a first touch sub-electrode 4 T14.

The second touch electrode each comprises four second touch sub-electrodes: a second touch sub-electrode 1 T21, a second touch sub-electrode 2 T22, a second touch sub-electrode 3 T23 and a second touch sub-electrode 4 T24.

The first touch sub-electrode 1 T11 of one of the first touch electrode takes up a second line and second row sublattice 2L2R, a second line and third row sublattice 2L3R, a third line and third row sublattice 3L3R as well as a third line and fourth row sublattice 3L4R of the checkerboard lattice S; the first touch sub-electrode 2 T12 takes up a fourth line and first row sublattice 4L1R and a fourth line and second row sublattice 4L2R of the checkerboard lattice S; the first touch sub-electrode 3 T13 takes up a fifth line and third row sublattice 5L3R and a fifth line and fourth row sublattice 5L4R of the checkerboard lattice S; the first touch sub-electrode 4 T14 takes up a sixth line and first row sublattice 6L1R and a sixth line and second row sublattice 6L2R of the checkerboard lattice S.

The second touch sub-electrode 1 T21 of one of the second touch electrode takes up a first line and third row sublattice 1L3R of the checkerboard lattice S; the second touch sub-electrode 2 T22 takes up a first line and fifth row sublattice 1L5R, a second line and fifth row sublattice 2L5R, a third line and fifth row sublattice 3L5R as well as a third line and sixth row sublattice 3L6R of the checkerboard lattice S; the second touch sub-electrode 3 T23 takes up a second line and seventh row sublattice 2L7R of the checkerboard lattice S; the second touch sub-electrode 4 T24 takes up a fourth line and third row sublattice 4L3R and a fourth line and fourth row sublattice 4L4R of the checkerboard lattice S;

The two first touch electrodes are centrally symmetrical with respect to a central point O of the checkerboard lattice S;

The two second touch electrodes are centrally symmetrical with respect to the central point O of the checkerboard lattice S;

The line direction of the checkerboard lattice S is the first direction, and the row direction of the checkerboard lattice S is the second direction.

It should be noted that the checkerboard lattice in the embodiment is a imaginary checkerboard lattice only for the purpose of describing the structure of the touch electrode assembly 500, and does not actually exist.

The touch electrode assembly 500 comprises two first touch electrodes 501 and two second touch electrodes 502. The two first touch electrodes 501 are insulated from each other, and the two second touch electrodes 502 are insulated from each other, and any first touch electrode and any second touch electrode are insulated from each other, i.e., one touch electrode assembly comprises four touch electrodes insulated from each other. The first touch electrode has a plurality of first effective widths in the second direction, the first effective widths are the widths of the first touch electrode along the first direction; the ratio of any two first effective widths is in the range of 0.9-1.12. The second touch electrode has a plurality of second effective widths along the first direction, the second effective widths are the widths of the second touch electrode along the first direction; the ratio of any two second effective widths is in the range of 0.9-1.12; the ratio of the effective widths of any first touch electrode and the effective widths of any second touch electrode is in the range of 0.9-1.12; the definitions of the first effective widths and the second effective widths are identical with those of the previous embodiment. FIG. 5a shows two first effective widths D11 and D12, and two second effective widths D21 and D22, where D21=D21a+D21b.

According to the graphic structure of a touch electrode according to the embodiment, the effective widths of each electrically independent touch electrode along the first direction have little difference, so that influences of display signals on the each touch electrode are basically consistent when an image is displayed by each touch electrode, therefore the issue that graphics of mutually fit touch electrode assemblies are visible when being displayed is solved; moreover, the graphic structure of the touch electrode provided by the embodiment can enable each touch electrode assembly has more uniform distribution due to the mutually fit of each touch electrode assembly. Thus, the each touch electrode assembly has a larger capacitive effective area, the touch precision and sensitivity can be enhanced, and pen touch can be supported better.

Alternatively, two second touch electrodes can be electrically connected. Two second touch electrodes in the embodiment can be an integrated structure, and are combined into a touch electrode. At the same time, any two second effective widths of the touch electrode in the second direction still meet the condition that the ratio is in the range of 0.9-1.12. The integrated structure simplifies the track design, and lowers the technological difficulty of manufacturing the touch electrode.

Alternatively, each sublattice of the checkerboard lattice is a square with the equal side length. It should be understood that when each sublattice of the checkerboard lattice is a square with the equal side length, each first touch sub-electrode and each second touch sub-electrode can be regarded as irregular graphics. Thus the design is beneficial to the tight arrangement of the touch electrode assemblies, thereby increasing the effective area of a capacitor, and enhancing the touch sensitivity.

Figure 6:
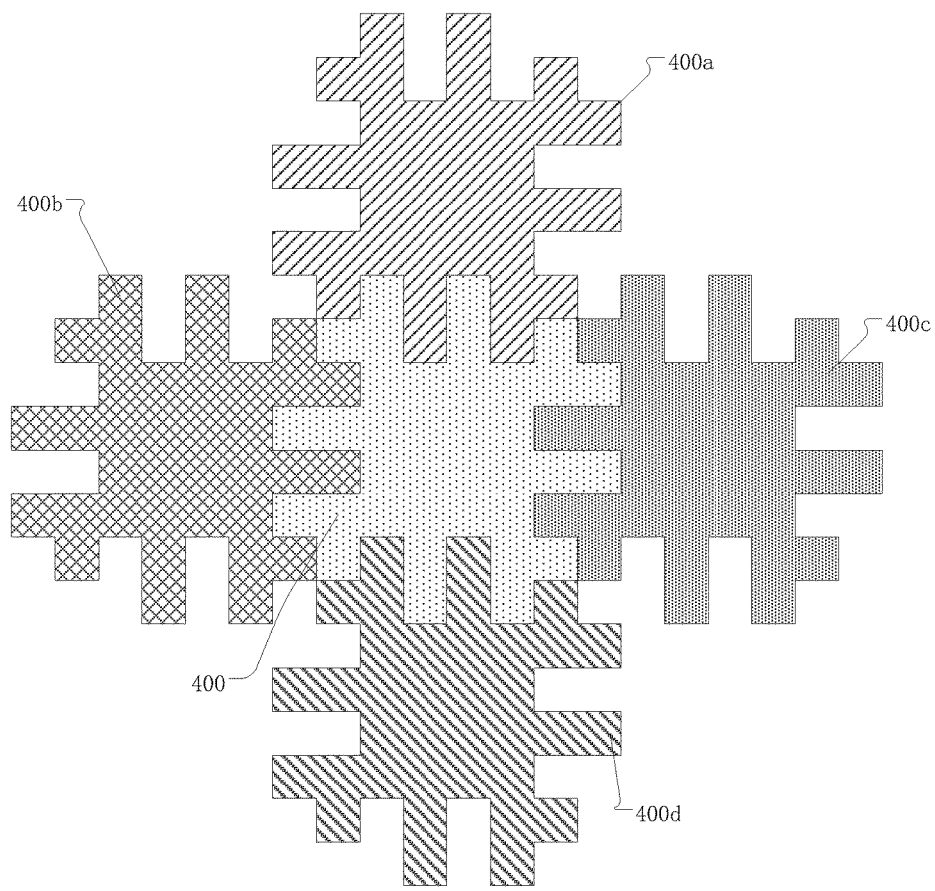
FIG. 6 is a schematic diagram of the mutual concave-convex fit mode of a plurality of touch electrode assemblies according to the embodiment of the disclosure.

Continue to refer to FIG. 6, FIG. 6 is a schematic diagram of mutually concave-convex fit of a plurality of touch electrode assemblies according to the embodiment. As shown in FIG. 6, one touch electrode assembly 400 and four adjacent touch electrode assemblies 400a, 400b, 400c and 400d are fit together in a concave-convex fit mode described in FIG. 1c. Compared with the graphic structure of the touch electrode in the previous embodiment, an electrical connection structure of each first touch sub-electrode and each second touch sub-electrode in one touch electrode assembly is simpler. It can be seen easily from FIG. 6 that the graphic structure of the touch electrode assembly in the embodiment and the one in the previous embodiment have the advantage of tight arrangement, and each touch electrode assembly has the necessary insulation distance, besides also has the largest touch electrode area, thereby further enhancing the touch sensitivity.

Further another embodiment provides a touch display panel comprising a graphic structure of the touch electrode as the graphic structure in the previous embodiments. The graphic structure in the previous embodiments will not be described in detail. The embodiment is characterized in that the touch display panel comprises a plurality of gate lines for transmitting drive scanning signals of a film transistor. The first direction is the same as a extension direction of the gate lines, and the second direction is perpendicular to the first direction.

Alternatively, the touch electrode assemblies act as touch electrodes at the touch phase, and act as common electrodes at the display phase, where the common electrodes provide common signals for display pixels.

The touch display panel generally comprises a plurality of display pixels, where each display pixel comprises a film transistor, a pixel electrode and a common electrode. A drain electrode of the film transistor is electrically connected with the pixel electrode. A source electrode of the film transistor is electrically connected with a data line. A gate electrode of the film transistor is electrically connected with one end of a gate line, and the other end of the gate line is connected with a gate driving circuit. When an image is displayed, the gate driving circuit can send a drive scanning signal, and the connection and disconnection of the film transistor are controlled by the gate line. When the film transistor is connected, a display signal is input into the display pixel via the data line, and is received by the pixel electrode. Meanwhile, the common electrode receives a common signal, and an electric field is formed between the pixel electrode and the common electrode form, thereby controlling the display panel to display images. In the embodiment, the touch electrode assembly acts as the common electrode at the display phase. At the touch phase, the touch electrode assembly receives a touch signal as a touch electrode, and by the multiplexing of the common electrode and the touch electrode, the manufacturing working procedure of the integrated touch display panel can be reduced, so that the manufacturing time can be shortened, and the manufacturing cost can be lowered.

The gate driving circuit opens each gate line in the form of line and line, and the display signal is input to the display pixel via the data line, and the process disturbs the common electrode to a certain extent, and the degree of disturbance is relevant to the width of the common electrode in the gate line direction. The first direction set in the embodiment is consistent with the extension direction of the gate lines, i.e., the first effective widths of the first touch electrode and the second effective widths of the second touch electrode of the touch electrode assembly are the widths of the gate lines in the extension direction. Further, the ratio of any two first effective widths, the ratio of any two second effective widths as well as the ratio of any first effective width and any second effective width are in the range of 0.9-1.12. By the above setting, the disturbance effects to the common electrodes by display signals are the same, so that the image can be displayed uniformly without the issue of the graphic visibility of the touch electrode assembly. According to the touch display panel provided by the embodiment, on the one hand, since the first touch electrode and the second touch electrode of the touch electrode assembly have approximate effective widths in the direction of the gate lines, the touch display panel has a good display effect, and on the other hand, because of the mutually fit between the touch electrode assemblies, the touch display panel has very high touch sensitivity, and can support the pen touch mode of 1.0-2.5 mm, so that a user has a better touch experience.

Figure 7A:
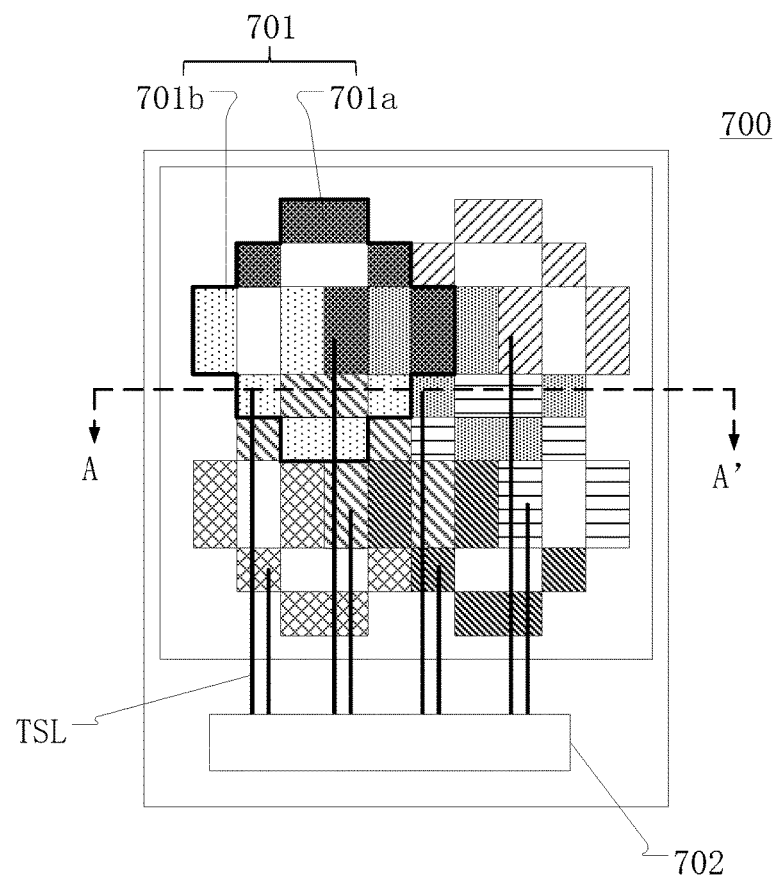
FIG. 7a is a schematic diagram of a touch display panel according to further another embodiment of the disclosure.
Figure 7B:
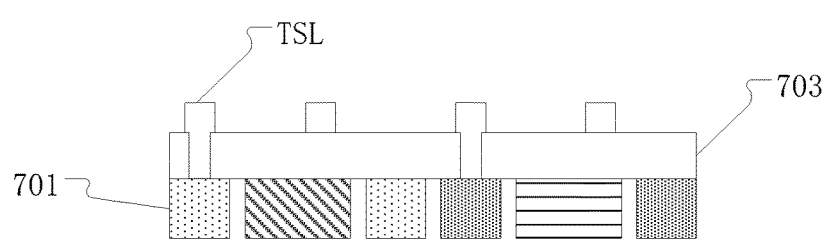

FIG. 7a is a schematic diagram of a touch display panel according to the embodiment. FIG. 7b is a sectional diagram taken along AA' in FIG. 7a.

As shown in FIG. 7a and FIG. 7b, the touch display panel 700 comprises an insulation layer 703 positioned at one side of a plurality of touch electrode assemblies 701, and a touch metal layer, the insulation layer 703 is positioned between the touch metal layer and the touch electrode assembly 701.

The touch metal layer comprises a plurality of touch signal lines TSL; a first touch electrode is electrically connected with at least one touch signal line TSL; each second touch electrode is electrically connected with at least one touch signal line TSL; the touch signal lines are used for transmitting touch signals to the first touch electrode and the second touch electrode.

Alternatively, the touch electrode assembly 701 in the embodiment can act as a self-capacitive touch electrode.

As one of the touch modes, the principle of the self-capacitive touch function is that, a touch circuit inputs a touch driving signal to the self-capacitive touch electrode, and meanwhile the touch electrode outputs a touch detection signal. When the touch display panel is touched, the capacitance of the self-capacitive touch electrode to the ground in the vicinity of a touch point can be changed, so that the touch detection signal output by the electrode is changed. Each touch electrode individually represents a coordinate point, and the positions of touch points can be defined after the touch detection signals of all the touch electrodes have been processed. In FIG. 7a, each first touch electrode 701a and each second touch electrode 701b are both electrically connected with a touch signal line TSL; the touch circuit 702 transmits the touch driving signals to the first touch electrode 701a and the second touch electrode 701b via the touch signal lines TSL, and the first touch electrode 701a and the second touch electrode 701b return the touch detection signals to the touch circuit via the touch signal lines TSL.

As shown in FIG. 7b, the insulation layer 703 has a plurality of through holes H, the touch signal lines TSL are electrically connected with the first touch electrode 701a via the through holes H, and the touch signal lines TSL are electrically connected with the second touch electrode 701b via the through holes H.

According to the touch display panel according to the embodiment, on the one hand, each touch electrode assembly, which is the self-capacitive touch electrode, can be fit with each other. In touch operation, the touch region per unit area can accommodate more self-capacitive touch electrodes, and moreover, the plurality of touch electrode assemblies can be fit tightly by the arrangement of the graphic structure of the specific touch electrode, so that the touch electrode assembly has the largest electrode area, and the touch display panel has very high sensitivity; on the other hand, the differences of effective widths of the first touch electrode and the second touch electrode of each touch electrode assembly along the first direction are very small. Therefore, the graphics of the touch electrode assembly cannot be visible when being displayed under the condition of keeping the high sensitivity of the touch display panel, therefore, the touch display panel has a better display effect.

Figure 8A:
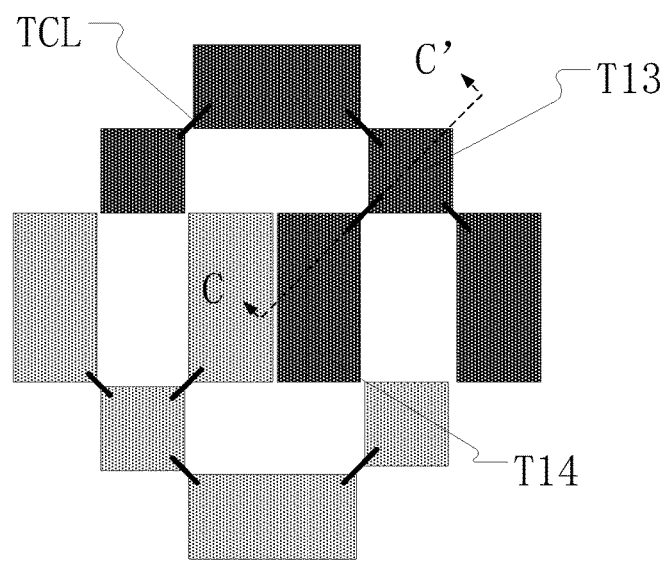
FIG. 8a is a schematic diagram of a connection of a touch electrode assembly according to the embodiment of the disclosure.
Figure 8B:
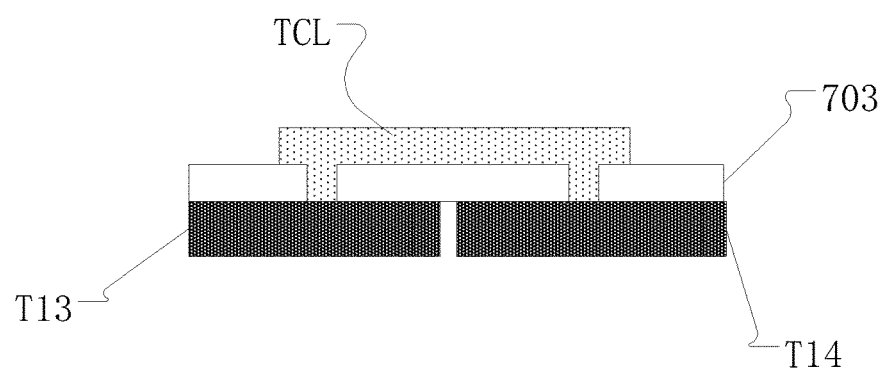

Alternatively, FIG. 8a is a schematic diagram of a connection of a touch electrode assembly according to the embodiment. FIG. 8b is a sectional diagram taken along CC' in FIG. 8a.

Referring to FIG. 8a, the touch metal layer also comprises touch electrode connection lines TCL. The touch electrode connection lines TCL is used for electrically connecting a plurality of first touch sub-electrodes of the first touch electrode and electrically connecting a plurality of second touch sub-electrodes of the second touch electrode.

The touch electrode connection lines are used for electrically connecting the plurality of first touch sub-electrodes of the first touch electrode, and electrically connecting the plurality of second touch sub-electrodes of the second touch electrode through a plurality of through holes of the insulation layer.

In order to better describe the connection mode of each first touch sub-electrode and each second touch sub-electrode of adjacent touch electrode assemblies, the first touch sub-electrode 3 T13 and first touch sub-electrode 4 T14 are electrically connected by touch electrode connection lines TCL, and keep the insulation with the second touch electrode.

The touch electrode connection lines TCL can be arranged at the same layer together with the touch signal lines for transmitting touch signal to the first touch electrode and the second touch electrode. The connection mode is free and simple, and the technological manufacturing is simplified.

Figure 9A:
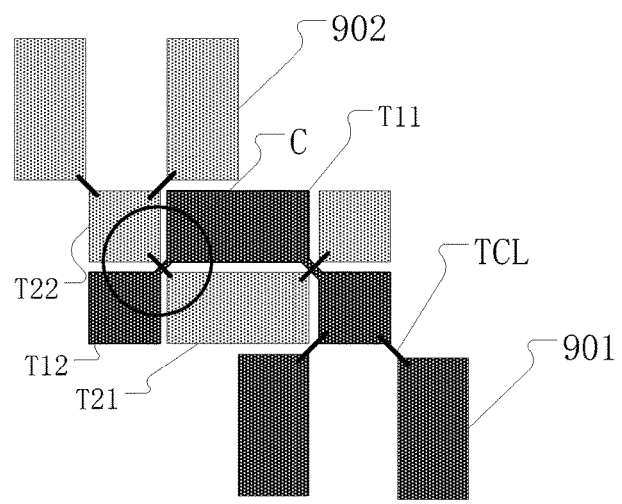
FIG. 9a is a schematic diagram of a connection of two touch electrode assemblies at the mutually fit part according to the embodiment of the disclosure.
Figure 9B:
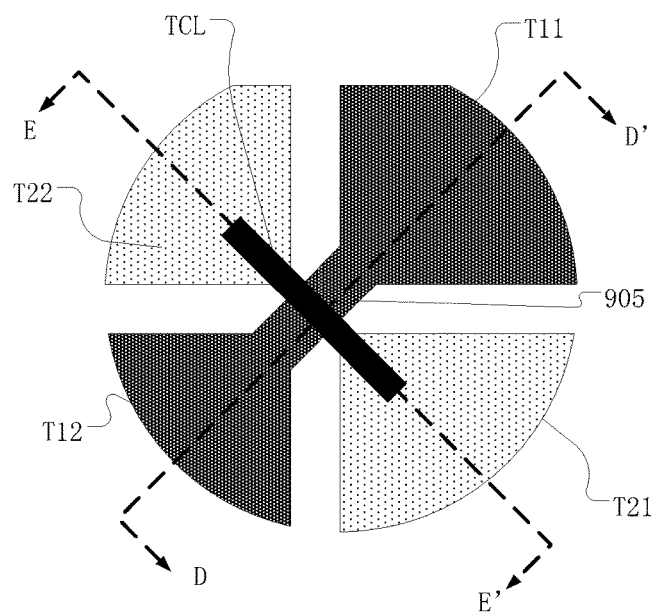
FIG. 9b is a partial amplified schematic diagram of FIG. 9a at the part C.
Figure 9C:
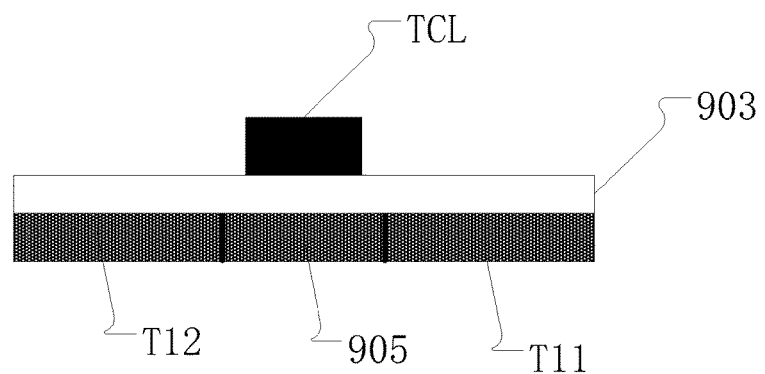
FIG. 9c is a sectional diagram taken along DD' in FIG. 9b.
Figure 9D:
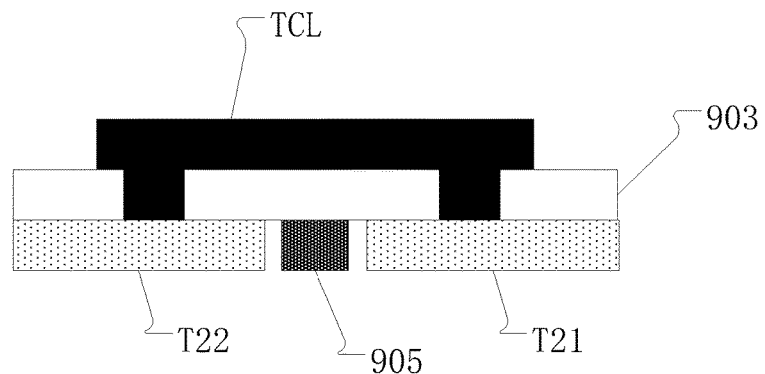
FIG. 9d is a sectional diagram taken along EE' in FIG. 9b.

Alternatively, FIG. 9a is a schematic diagram of a connection of two touch electrode assemblies at the mutually fit part according to the embodiment. FIG. 9b is a partially amplified schematic diagram at the part C of FIG. 9a. FIG. 9c is a sectional diagram at part DD' of FIG. 9b. FIG. 9d is a sectional diagram at part EE' of FIG. 9b. As shown in FIG. 9a-9d, a plurality of first touch sub-electrodes of the first touch electrode are electrically connected by common electrodes 905; and/or A plurality of second touch sub-electrodes of the second touch electrode are electrically connected by common electrodes 905.

The embodiment shows the first mutually fit mode between the adjacent electrode assemblies, namely, the electrical connection mode among a plurality of first touch sub-electrodes of the first touch electrode and the electrical connection mode among a plurality of second touch sub-electrodes of the second touch electrode when the adjacent electrode assemblies are in mutual encircling and fitting mode. In order to describe the connection mode of the adjacent touch electrode assemblies better in the mutually fit part, FIG. 9a only shows a first touch electrode of one touch electrode assembly and a second touch electrode of the other touch electrode assembly. At the mutually fit part, two touch sub-electrodes T12 and T11 of the first touch electrode are electrically connected by common electrodes 905, the second touch sub-electrodes 1 T21 and second touch sub-electrodes 2 T22 of the second touch electrode encircled in the first touch electrode 901 are electrically connected by touch connection lines TCL, insulation layers 903 are formed between the touch connection lines TCL and the common electrodes 905. The mutual combined connection mode between the touch connection lines TCL and the common electrodes guarantees the insulation relationship between the first touch electrode 901 and the second touch electrode 902, and make the arrangement more free between the first touch sub-electrodes and the second touch sub-electrodes.

It should be noted that the embodiment provides a connection mode among touch electrode assemblies in the first mutually fit mode. Regarding to the second mutually fit mode, the adjacent touch electrode assemblies which are fit in a concave-convex mode can be connected by the touch connection lines, so that the technological manufacturing is simpler.

Figure 10:
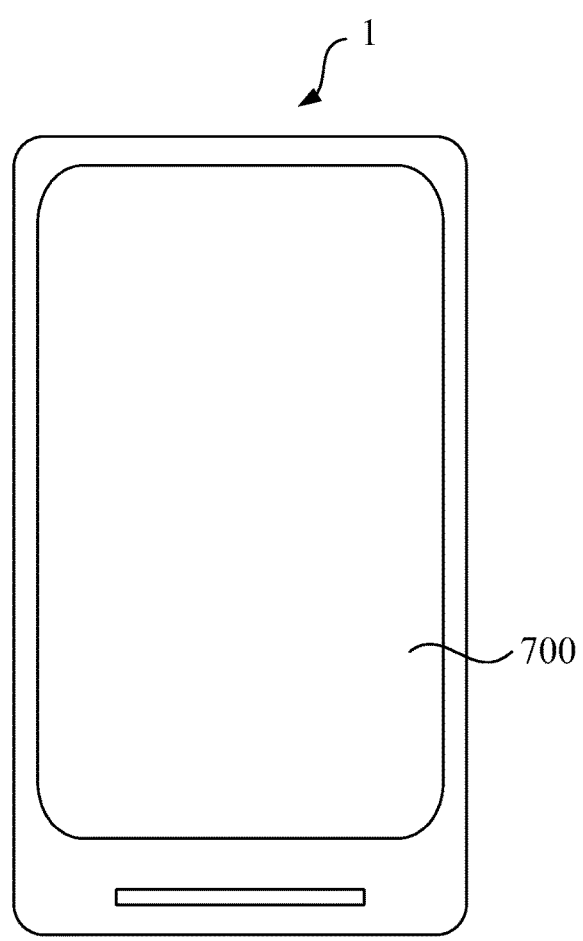
FIG. 10 is a schematic diagram of a touch display device according to an embodiment of the present disclosure.

Alternatively, the embodiment also provides a touch display device. According to any of the above touch display panel, the touch display device can be a cell phone, a desktop computer, a laptop, a tablet personal computer, an electronic photo and the like. As shown in FIG. 10, the touch display device 1 is a cell phone and includes the touch display panel 700 in the above embodiments. The touch display device provided by the embodiment has high touch sensitivity and good display effect.

It should be noted that merely preferred embodiments and the applied technical scheme of the present disclosure are described above, and a person skilled in the art should know that the present disclosure is not limited to the preferred embodiments. Various obvious variations, readjustment and substitutions can be made by those skilled person in the art may without departing from the protection scope of the present disclosure. Therefore, the present disclosure is described in detail by the embodiments, but the present disclosure is not limited thereto, and also can include more other equivalent embodiments without departing from the concept of the disclosure, and the scope of the present disclosure is determined by the scope of the attached claims.

The invention claimed is:

1. A graphic structure of a touch electrode, comprising a plurality of touch electrode assemblies, wherein
the plurality of touch electrode assemblies are arranged in an array mode and insulated from each other;
the plurality of touch electrode assemblies comprise a first touch electrode assembly and a second touch electrode assembly, a part of the first touch electrode assembly is encircled by the second touch electrode assembly, and a part of the second touch electrode assembly is encircled by the first touch electrode assembly;
one of the plurality of touch electrode assemblies comprises at least one first touch electrode and at least one second touch electrode, and the first touch electrodes and the second touch electrodes are insulated from each other;
one of the at least one first touch electrode has a plurality of first effective widths, which are arranged in a second direction and each of which extends in a first direction, and a ratio between two of the plurality of first effective widths of the first touch electrode is a1, wherein, $0.9 \leq a1 \leq 1.12$;

one of the at least one second touch electrode has a plurality of second effective widths, which are arranged in the second direction and each of which extends in the first direction, and the ratio between any two second effective widths of a second touch electrode is a2, wherein, $0.9 \leq a2 \leq 1.12$; and
the ratio between any the first effective width and any the second effective width is b, wherein, $0.9 \leq b \leq 1.12$.

2. A graphic structure of a touch electrode according to claim 1, wherein,
the first touch electrode comprises a plurality of first touch sub-electrodes which are electrically connected and are rectangular electrodes; and/or
the second touch electrode comprises a plurality of second touch sub-electrodes which are electrically connected and are rectangular electrodes.

3. A graphic structure of a touch electrode according to claim 2, wherein,
one of the touch electrode assemblies comprises one first touch electrode and one second touch electrode, wherein the first touch electrode comprises six first touch sub-electrodes: a first touch sub-electrode 1, a first touch sub-electrode 2, a first touch sub-electrode 3, a first touch sub-electrode 4, a first touch sub-electrode 5 and a first touch sub-electrode 6;
the second touch electrode comprises six second touch sub-electrodes: a second touch sub-electrode 1, a second touch sub-electrode 2, a second touch sub-electrode 3, a second touch sub-electrode 4, a second touch sub-electrode 5 and a second touch sub-electrode 6;
for one of the plurality of touch electrode assemblies, the first touch sub-electrode 1 and the first touch sub-electrode 6 are orderly arranged in the first line 1L in the first direction, the first touch sub-electrode 2 and the first touch sub-electrode 3 are orderly arranged in the second line 2L in the first direction, the second touch sub-electrode 4, the second touch sub-electrode 5, the first touch sub-electrode 4 and the first touch sub-electrode 5 are orderly arranged in the third line 3L in the first direction, the second touch sub-electrode 2 and the second touch sub-electrode 3 are orderly arranged in the fourth line 4L in the first direction, and the second touch sub-electrode 1 and the second touch sub-electrode 6 are orderly arranged in the fifth line 5L in the first direction;
and for one of touch electrode assembly, the second touch sub-electrode 4 is arranged in the first row 1R in the second direction, the first touch sub-electrode 2 and the second touch sub-electrode 2 are orderly arranged in the second row in the second direction, the first touch sub-electrode 1, the second touch sub-electrode 5 and the second touch sub-electrode 1 are orderly arranged in the third row 3R in the second direction, the first touch electrode 6, the first touch sub-electrode 4 and the second touch sub-electrode 6 are orderly arranged in the fourth row 4R in the second direction, the first touch sub-electrode 3 and the second touch sub-electrode 3 are orderly arranged in the fifth row 5R in the second direction, and the first touch sub-electrode 5 is arranged in the sixth row 6R in the second direction;
where the first touch sub-electrode 1 and the first touch sub-electrode 6 are an integrated structure, and the second touch sub-electrode 1 and the second touch sub-electrode 6 are an integrated structure.

4. A graphic structure of a touch electrode according to claim 3, wherein, lengths of each of the six first touch sub-electrodes and each of the six second touch sub-electrodes in the first direction and lengths of the first touch sub-electrode 1, the first touch sub-electrode 2, the first touch sub-electrode 3, the first touch sub-electrode 6, the second touch sub-electrode 1, the second touch sub-electrode 2, the second touch sub-electrode 3 and the second touch sub-electrode 6 in the second direction are in the range of 0.75 mm-1.625 mm;

the lengths of the first touch sub-electrode 4, the first touch sub-electrode 5, the second touch sub-electrode 4 and the second touch sub-electrode 5 in the second direction are in the range of 1.5 mm-3.25 mm.

5. A graphic structure of a touch electrode according to claim 3, wherein, a length of each of the six touch sub-electrodes in the first direction is equal to a length of each of the six second touch sub-electrode in the first direction;

lengths of the first touch sub-electrode 4, the first touch sub-electrode 5, the second touch sub-electrode 4 and the second touch sub-electrode 5 in the second direction are equal;

the lengths of the first touch sub-electrode 1, the first touch sub-electrode 2, the first touch sub-electrode 3, the first touch sub-electrode 6, the second touch sub-electrode 1, the second touch sub-electrode 2, the second touch sub-electrode 3 as well as the second touch sub-electrode 6 in the second direction are equal;

the lengths of the first touch sub-electrode 4, the first touch sub-electrode 5, the second touch sub-electrode 4 and the second touch sub-electrode 5 in the second direction are twice the lengths of the first touch sub-electrode 1, the first touch sub-electrode 2, the first touch sub-electrode 3, the first touch sub-electrode 6, the second touch sub-electrode 1, the second touch sub-electrode 2, the second touch sub-electrode 3 and the second touch sub-electrode 6 in the second direction.

6. A graphic structure of a touch electrode according to claim 5, wherein, one of the plurality of touch electrode assemblies and four adjacent touch electrode assemblies are encircled and fit with each other to form a touch electrode assembly group.

7. A graphic structure of a touch electrode according to claim 6, wherein, the touch electrode assembly group is in turn in the first direction a first touch electrode assembly, a second touch electrode assembly and a third touch electrode assembly;

the touch electrode assembly group in turn in the second direction a fourth touch electrode assembly, a second touch electrode assembly and a fifth touch electrode assembly.

8. A graphic structure of a touch electrode according to claim 7, wherein, a first touch electrode 5 of the first touch electrode assembly is positioned in a region encircled by the first touch sub-electrode 2, the second touch sub-electrode 2, the second touch sub-electrode 4 and the second touch sub-electrode 5 of the second touch electrode assembly;

a second touch sub-electrode 4 of the third touch electrode assembly is positioned in a region encircled by the first touch sub-electrode 3, the first touch sub-electrode 4, the first touch sub-electrode 5 and the second touch sub-electrode 3 of the second touch electrode assembly;

a second touch sub-electrode 1 of the fourth touch electrode assembly is positioned in an area encircled by the first touch sub-electrode 1, the first touch sub-electrode 6, the first touch sub-electrode 2, the first touch sub-electrode 3, the first touch sub-electrode 4 and the second touch sub-electrode 5 of the second touch electrode assembly;

a first touch sub-electrode 1 of the fifth touch electrode assembly is positioned in an area encircled by the second touch sub-electrode 1, the second touch sub-electrode 2, the second touch sub-electrode 3, the second touch sub-electrode 5 and the first touch sub-electrode 4 of the second touch electrode assembly.

9. A graphic structure of a touch electrode according to claim 1, wherein, each of the plurality of touch electrode assemblies comprises two first touch electrodes and two second touch electrodes, and is positioned in a checkerboard lattice with eight-line and eight-row, and the checkerboard lattice comprises 64 sublattices;

the two first touch electrodes each comprise four first touch sub-electrodes: a first touch sub-electrode 1, a first touch sub-electrode 2, a first touch sub-electrode 3 and a first touch sub-electrode 4;

the two second touch electrodes each comprise four second touch sub-electrodes: a second touch sub-electrode 1, a second touch sub-electrode 2, a second touch sub-electrode 3 and a second touch sub-electrode 4;

the first touch sub-electrode 1 of one of the first touch electrodes takes up a second line and second row sublattice, a second line and third row sublattice, a third line and third row sublattice and a third line and fourth row sublattice of the checkerboard lattice; the first touch sub-electrode 2 takes up a fourth line and first row sublattice and a fourth line and second row sublattice of the checkerboard lattice; the first touch sub-electrode 3 takes up a fifth line and third row sublattice and a fifth line and fourth row sublattice of the checkerboard lattice; the first touch sub-electrode 4 takes up a sixth line and first row sublattice and a sixth line and second row sublattice of the checkerboard lattice;

the second touch sub-electrode 1 of one of the second touch electrodes takes up a first line and third row sublattice of the checkerboard lattice; the second touch sub-electrode 2 takes up a first line and fifth row sublattice, a second line and fifth row sublattice, a third line and fifth row sublattice and a third line and sixth row sublattice of the checkerboard lattice; the second touch sub-electrode 3 takes up a second line and seventh row sublattice of the checkerboard lattice; the second touch sub-electrode 4 takes up a fourth line and third row sublattice and a fourth line and fourth row sublattice of the checkerboard lattice;

the two first touch electrodes are centrally symmetrical with respect to a central point of the checkerboard lattice;

the two second touch electrodes are centrally symmetrical with respect to the central point of the checkerboard lattice; and the line direction of the checkerboard lattice is the first direction, and the row direction of the checkerboard lattice is the second direction.

10. A graphic structure of a touch electrode according to claim 9, wherein, the two second touch electrodes are electrically connected.

11. A graphic structure of a touch electrode according to claim 10, wherein, the sublattices of the checkerboard lattice each is a square with the equal side length.

12. A graphic structure of a touch electrode according to claim 11, wherein, one of the plurality of touch electrode assemblies and four adjacent touch electrode assemblies are fit with each other in a concave-convex fit mode.

13. A touch display panel comprising the graphic structure of the touch electrode according to claim 1, wherein the touch display panel further comprises:
    a plurality of gate lines for transmitting drive scanning signals for a film transistor;
    the first direction is the same as an extension direction of the gate lines;
    the second direction is perpendicular to the first direction; and
    the touch electrode assemblies act as touch electrodes at a touch phase, and act as common electrodes at a display phase, wherein the common electrodes provide common signals for display pixels.

14. The touch display panel according to claim 13, further comprising
    an insulation layer positioned at one side of the touch electrode assembly;
    a touch metal layer, the insulation layer is positioned between the touch metal layer and the touch electrode assembly; and
    the touch metal layer comprises a plurality of touch signal lines, each of the at least one first touch electrode is electrically connected with at least one of the touch signal lines; each of the at least one second touch electrode is electrically connected with at least one of the touch signal lines, the touch signal lines are adapted for transmitting touch signals for the first touch electrodes and the second touch electrodes.

15. The touch display panel according to claim 14, wherein,
    the touch metal layer further comprises a touch electrode connecting line;
    the touch electrode connecting line is adapted for electrically connecting a plurality of first touch sub-electrodes of one of the at least one first touch electrode and electrically connecting a plurality of second touch sub-electrodes of one of the at least one second touch electrode.

16. The touch display panel according to claim 14 or claim 15, wherein,
    the insulation layer is provided with a plurality of through holes; and
    the touch signal lines are electrically connected with the at least one first touch electrode and with the at least one second touch electrode via the through holes; or the touch electrode connecting line is adapted for electrically connecting a plurality of first touch sub-electrodes of one of the at least one first touch electrode and electrically connecting a plurality of second touch sub-electrodes of one of the at least one second touch electrode via the through holes.

17. A touch display device, comprising the touch display panel according to the claim 13.

18. A graphic structure of a touch electrode according to claim 1, wherein the part of the first touch electrode assembly is completely encircled by the second touch electrode assembly.

19. A graphic structure of a touch electrode according to claim 1, wherein the part of the first touch electrode assembly is positioned within a concave part of the second touch electrode assembly.

20. A graphic structure of a touch electrode according to claim 1, wherein the size of the first touch electrode is the same as that of the second touch electrode.

* * * * *